(12) United States Patent
Zhang et al.

(10) Patent No.: US 6,632,264 B2
(45) Date of Patent: Oct. 14, 2003

(54) GOLD RECOVERY FROM THIOSULFATE LEACHING

(75) Inventors: Hongguang Zhang, Bull Creek (AU); David Dreisinger, Delta (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 09/837,756

(22) Filed: Apr. 17, 2001

(65) Prior Publication Data

US 2003/0051581 A1 Mar. 20, 2003

(51) Int. Cl.$^7$ ................................................. C22B 3/24
(52) U.S. Cl. ............................................. 75/722; 423/24
(58) Field of Search ................................ 75/722; 423/24

(56) References Cited

U.S. PATENT DOCUMENTS

| | | | |
|---|---|---|---|
| 4,070,182 A | 1/1978 | Berezowsky et al. | 75/103 |
| 4,269,622 A | 5/1981 | Kerley, Jr. | 75/103 |
| 4,289,532 A | 9/1981 | Matson et al. | 75/105 |
| 4,369,061 A | 1/1983 | Kerley, Jr. | 75/103 |
| 4,384,889 A | 5/1983 | Wiewiorowski et al. | 75/101 |
| 4,552,589 A | 11/1985 | Mason et al. | 75/105 |
| 4,578,163 A | 3/1986 | Kunter et al. | 204/110 |
| 4,654,078 A | 3/1987 | Perez et al. | 75/118 R |
| 4,723,998 A | 2/1988 | O'Neil | 75/101 R |
| 4,738,718 A | 4/1988 | Bakshani et al. | 75/105 |
| 4,765,827 A | 8/1988 | Clough et al. | 75/2 |
| 4,801,329 A | 1/1989 | Clough et al. | 423/22 |
| 4,816,235 A | 3/1989 | Pesic | 432/32 |
| 4,902,345 A | 2/1990 | Ball et al. | 75/118 R |
| 4,923,510 A | 5/1990 | Ramadorai et al. | 423/29 |
| 4,925,485 A | 5/1990 | Schulze | 423/22 |
| 5,051,128 A * | 9/1991 | Kubo | 423/24 |
| 5,071,477 A | 12/1991 | Thomas et al. | 75/744 |
| 5,127,942 A | 7/1992 | Brierley et al. | 75/743 |
| 5,215,575 A | 6/1993 | Butler | 75/744 |
| 5,236,492 A | 8/1993 | Shaw et al. | 75/744 |
| 5,354,359 A | 10/1994 | Wan et al. | 75/744 |
| 5,362,470 A | 11/1994 | Masutomi et al. | 423/509 |
| 5,536,297 A | 7/1996 | Marchbank et al. | 75/736 |

(List continued on next page.)

FOREIGN PATENT DOCUMENTS

| | | |
|---|---|---|
| WO | WO 91/11539 | 8/1991 |
| WO | WO 94/06944 | 3/1994 |
| WO | WO 00/65112 | 11/2000 |

OTHER PUBLICATIONS

Hemmati, et al., Study of the Thiosulphate Leaching of Gold from Carbonaceous Ore and the Qunatitative Determination of Thiosulphate in the Leached Solution, Extraction Metalurgy, 1988 Symp., Inst. Min. Metall, London, Jan. 1989, pp. 665–678.

Wan R. Y., et al., Research and Development Activities for the Recovery of Gold from Noncyanide Solutions; Hydrometallurgy: Fundamentals, Technology and Innovation, SME–TMS, 1993, pp. 415–436, Chapter 27, No Month.

(List continued on next page.)

Primary Examiner—Melvyn Andrews
(74) Attorney, Agent, or Firm—Christie, Parker & Hale, LLP

(57) ABSTRACT

Processes for recovering gold from copper-gold ores thiosulfate leaching or gold ores copper catalyzed thiosulfate leaching using ion exchange technology are disclosed. The processes include subjecting the gold-bearing and copper-bearing thiosulfate solution to a pH and/or temperature adjustment to reduce tetrathionate concentration in the thiosulfate solution prior to contacting with an ion exchange resin. The ion exchange resin once loaded with gold and optionally copper is eluted with a mixture of sodium tetrathionate, ammonium thiosulfate and sodium sulfite. Gold and optionally copper are recovered from the eluate by electrowinning or precipitation.

34 Claims, 2 Drawing Sheets

U.S. PATENT DOCUMENTS

| | | | |
|---|---|---|---|
| 5,785,736 A | 7/1998 | Thomas et al. | 75/736 |
| 5,876,588 A | 3/1999 | Lalancette et al. | 205/560 |
| 6,180,080 B1 | 1/2001 | Proulx et al. | 423/576.6 |
| 6,344,068 B1 | 2/2002 | Fleming et al. | 75/736 |

OTHER PUBLICATIONS

Awadalla, et al., The Recovery of Gold from Thiourea, Thiocyanate or Thiosulfate Solutions by Reduction–Precipitation with a Stabilized Form of Sodium Borohydride; Separation Science and Technology, 26(9), pp. 1207–1208, Jan. 1991.

Tozawa, et al., Dissolution of Gold in Ammoniacal Thiosulfate Solution paper presented at the $110^{th}$ Annual meeting of AIME, Chicago, Illinois Feb. 1981 paper TMS A81–251 pp. 1–11.

Langhans, et al., Copper–catalyzed Thiosulfate Leaching of Lowgrade Gold Ores, Hydrometallurgy, 29, Jun. 1992, pp. 191–203.

Thomas, et al., Alkaline and Acidic Autoclaving of Refractory Gold Ores; JOM, Feb. 1991, pp. 16–19.

Flett, et al., Chemical Study of Thiosulfate Leaching of Silver Sulphide; TIMM, C92, pp. 216–223, Dec. 1983.

Wan, et al., Thisulfate leaching following biooxidation pretreatment for gold recovery from refractory carbonaceous-sulfidic ore, Aug. 1997, Mining Engineering, pp. 76–80.

Miura, Y. et al., Spectrophotometric Determination of Tetrathionate by Means of Its Alkaline Decomposition, The Chemical Society of Japan, 1983 (111), p. 1597–1601. (In Japanese with English Abstract), No Month.

Koh, T., et al., Spectrophotometric Determination of Micro Amounts of Tetrathionate in Mixtures with Thiosulfate and Sulfite by Means of Its Sulfitolysis, The Chemical Society of Japan, 1979 (3), p. 348–353. (In Japanese with English Abstract), No Month.

Nugent, E.A., The Chemistry of the Poisons Associated with the Ion–Exchange Process, The South African Industrial Chemist, Nov. 1956, p. 282–290, No Month.

Robinson, R.E., The Chemistry of the Ion Exchange Process for the Extraction of Uranium From Rapid Leach Liquors, The South African Industrial Chemist, Nov. 1956, p. 273–281, No Month.

Kurtenacker, A., et al., Spontaneous Decomposition of Polythionate Solutions, Chemical abstracts, 1935, p. 980, vol. 30. No Month.

Goehring, M. et al., Spontaneous Decomposition of Polythionate Solutions, Chemical Abstracts, 1947, p. 2886e, vol. 43. No Month.

Tao, J. et al., Electrochemistry and Mechanisms of Leaching Gold with Ammoniacal Thiosulphate, XVII International Processing Congress, May 23–28, 1993, p. 1141–1146, Sydney.

Gallagher, N.P., Affinity of Activated Carbon Towards Some Gold (I) Complexes. Hydrometallurgy, 1990, p. 305–316, vol. 25, Elsevier Science Publishers B.V. No Month.

Steudel, R. et al., Ion–Pair Chromatographic Separation of Polythionates $S_nO_6^2$ With up to Thirteen Sulphur Atoms, Journal of Chromatography, 1986, p. 379–384, vol. 361, Elsevier Science Publishers B.V., Amsterdam. No Month Burns, D.T. et al., Reactions of the Elements and Their Compounds, Part B: Osmium to Zirconium, Inorganic Reaction Chemistry, vol. 2, 1981, p. 428–431, Ellis Horwood Limited. No Month.

Lyons, D. et al., Inorganic Sulphur Chemistry, , 1968, p. 524–531, Elsevier Publishing Company, Amsterdam. No Month.

Byerley, J.J. et al., Kinetics and Mechanism of the Oxidation of Thiosulphate Ions by Copper–(II) Ions in Aqueous Ammonia Solution, J. Chem. Soc. Dolton Trans., 1973, p. 889–893. No Month.

Abbruzzese, C. et al., Thiosulphate Leaching for Gold Hydrometallurgy, Hydrometallurgy, vol. 39, 1995, p. 265–276, Elsevier Science B.V. No Month.

Li, J. et al., Important Solution Chemistry Factors That Influence the Copper–Catalyzed Ammonium Thiosulfate Leaching of Gold, $125^{th}$ SME Annual Meeting, Mar. 11–14, 1996, 20 pp.

Zipperian D. et al., Gold and Silver Extraction by Ammoniacal Thiosulfate Leaching from a Rhyolite Ore, Hydrometallurgy, vol. 19, 1988, p. 361–375, Elsevier Science Publishers B.V. No Month.

Berezosky, R.M.G.S. et al., Recovery of Gold and Silver From Oxidation Leach Residues by Ammoniacal Thiosulphate Leaching, $108^{th}$ AIME Annual Meeting, Feb. 18–22, 1979, 17 pps.

Gallagher, N.P. et al., Interaction of Gold Cyanide, Thiocynate Thiosulfate and Thiourea Complexes with Carbon Matrices, M.S. Thesis, University of Nevada, Reno, May 1987, 182 pp.

Molleman, E., The Treatment of Copper–Gold Ores by Ammonium Thiosulfate Leaching, M.A. Sc. Thesis, The University fo British Columbia, 1998, 186 pp. No Month.

Guerra, E., a Study of the Factors Affecting Copper Cementation of Gold From Ammoniacal Thiosulfate Solutions, Masters Thesis, The University of British Columbia, 1997, 74 pp. No Month.

Fava, A. et al., Studies of the Decomposition of Polythionates in Alkaline Medium and in Neutral Medium by the Aid of Radioactive Sulfur, Chemical Abstracts, 1953, vol. 47, p. 11914d. No Month.

Fava, A. et al., Decomposition of Solutions of Polythionates by means of Radioactive Sulfur, Chemical Abstracts, 1954, vol. 48, p. 4349e. No Month.

Guerra, E. et al., A Study of the Factors Affecting Copper Cementation of Gold from Ammoniacal Thiosulphate Solution, Hydrometallurgy, 1999, vol. 51, p. 155–172, Elsevier Science B.V. No Month.

\* cited by examiner

GOLD RECOVERY FROM THIOSULFATE LEACHING

FIELD OF THE INVENTION

The invention is in the field of aqueous chemistry, particularly ion exchange chemistry. Various aspects of the invention involve interactions between ion exchange resins and gold-bearing thiosulfate solutions.

BACKGROUND OF THE INVENTION

One of the conventional methods for the extraction of gold from its ores requires a cyanidation process in which a finely ground gold-bearing ore is leached with a solution containing cyanide ion. In the presence of an oxidant, usually oxygen as supplied by air, gold is dissolved into the solution as a cyanide complex, generating a gold-bearing leachate. The recovery of gold from the leachate can then be effected by adsorption with activated carbon, for example, using the widely adopted carbon-in-pulp (CIP) process, or by cementation with zinc using the well known Merrill-Crowe process.

In an alternative process to cyanidation, gold may also be leached from ores or other gold-bearing materials with a thiosulfate solution in the presence of oxygen under alkaline conditions. Gold is thought to be brought into solution in the form of a gold thiosulfate complex according to the following reaction:

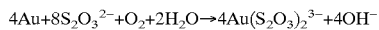

$$4Au+8S_2O_3^{2-}+O_2+2H_2O \rightarrow 4Au(S_2O_3)_2^{3-}+4OH^-$$

The thiosulfate leach may involve the addition of ammonia, as the ammonium thiosulfate salt, and copper, usually as the pentahydrated cupric sulfate salt, as catalysts. This process is for example described in U.S. Pat. No. 4,269,622 dated May 26, 1981, U.S. Pat. No. 4,369,061 dated Jan. 18, 1983 and U.S. Pat. No. 4,654,078 dated Mar. 31, 1987. It has been suggested that one of the advantages of the thiosulfate leach may be that it is particularly suitable for treating some of the refractory ores, for example carbonaceous ores and copper-gold ores, for which cyanidation is ineffective or uneconomical.

PCT application WO 00/65112 teaches the recovery of gold from an aqueous ammoniacal thiosulfate solution by liquid/liquid or liquid/solid extraction with an extraction reagent having either a guanidyl functionality or quaternary amine functionality mixed with a weak organic acid. Gold is stripped from the extraction reagent with an aqueous caustic solution optionally containing cyanide. Thomas et al., U.S. Pat. No. 5,785,736 discloses recovery of gold and copper from a gold-bearing and copper-bearing thiosulfate solution using a suitable ion exchange resin to adsorb the metals onto the resin. The adsorbed copper is then eluted from the resin using a thiosulfate solution to generate a copper bearing eluate and the adsorbed gold is eluted using a thiocyanate solution to generate a gold bearing solution.

SUMMARY OF THE INVENTION

The present invention recognizes that the presence of tetrathionate, even at a very low concentration, may significantly decrease copper and gold loading on ion exchange resins. The present invention also recognizes that under typical conditions for thiosulfate leaching and ion exchange processes (such as pH 8–10 in the presence of copper), a large amount of tetrathionate may continuously be generated through copper catalyzed oxidation of thiosulfate by oxygen in the air. Consequently the adsorption of precious metals on resins may be inhibited and the resins may need to be reconditioned.

The present invention provides a process for loading gold onto an ion exchange resin having affinity for gold from a thiosulfate solution containing polythionates, such as tetrathionate, comprising reducing the concentration of polythionate, such as tetrathionate, in the gold-bearing thiosulfate solution prior to contacting the solution with an ion exchange resin. Reduction of tetrathionate concentration may for example be achieved by adjustment of the pH of the gold-bearing thiosulfate solution, such as by raising the pH to a value from about 10 to about 12, or by treatment at elevated temperature for a sufficient period of time, or by both pH and temperature adjustment.

In one aspect, the invention provides a process for loading gold onto an ion exchange resin from a thiosulfate solution in the presence of copper ions. The copper ions may be cupric ions, cuprous ions or mixture thereof. The cupric ions may comprise cupric sulfate, or cupric ammine or cupric sulfate and cupric ammine. The cuprous ions may comprise cuprous trithiosulfate, or cuprous dithiosulfate or, cuprous thiosulfate or mixtures thereof. The ion exchange resin may have affinity for both gold and copper. In one aspect, the process may comprise adjusting the pH or temperature or both pH and temperature of the gold-bearing and copper-bearing thiosulfate solution for a sufficient period of time to produce a gold-bearing and copper-bearing loading solution having a reduced tetrathionate concentration. The pH may for example be adjusted to a value from about 10 to about 12 and the temperature ranges from about 20° C. to about 60° C. In alternative embodiments the pH may be adjusted from a minimum of about 9.5, 10, 10.5, 11 or 11.5 to a maximum of 10, 10.5, 11, 11.5, 12 or 12.5, such as from about 10.5 to 11.5. In alternative embodiments, the pH may be about 9, 10, 11 or 12, with a pH of about 11 being preferred in some embodiments.

The invention also provides processes for recovering gold from copper-gold ores thiosulfate leaching or copper catalyzed gold ores thiosulfate leaching using ion exchange resin technology. In one aspect, the invention provides a process for recovering gold from a slurry comprising a solid ore residue and a gold-bearing and a copper-bearing thiosulfate solution containing tetrathionate comprising adjusting the pH and/or the temperature of the slurry for a sufficient period of time to produce a loading slurry having a gold-bearing and copper-bearing loading solution having a reduced tetrathionate concentration. The loading slurry may be contacted with an ion exchange resin having affinity for gold and copper to adsorb gold and copper from the gold-bearing and copper-bearing loading solution onto the resin to produce a loaded resin. Next the loaded resin may be separated from the slurry and copper and gold are eluted. In a preferred embodiment copper and gold are eluted with the same eluant and gold may be recovered from the gold-bearing and copper-bearing eluate by electrowinning or precipitation. Alternatively the gold-bearing and copper-bearing loading solution may be separated from the slurry and contacted with the ion exchange resin. Copper and gold are then eluted as previously described.

The decomposition of tetrathionate in alkaline solution gives thiosulfate and sulfite with most of the tetrathionate being transferred to thiosulfate which can be then advantageously recycled in the gold and/or copper leaching.

In another aspect, the invention provides processes for eluting gold and optionally copper loaded onto an ion exchange resin from a thiosulfate solution that are environmental compatible alternatives to the conventional processes using cyanide or thiocyanate as eluant. In one embodiment the elution process may be carried out with an eluant comprising a mixture of sodium tetrathionate, ammonium thiosulfate and sodium sulfite. The tetrathionate anions displace the gold-thiosulfate and optionally the copper-thiosulfate complexes from the resin with the thiosulfate stabilizing the eluted gold and optionally eluted copper and the sulfite preventing the precipitation of elemental sulfur. After elution the resin may be reconditioned by alkaline treatment to remove the adsorbed tetrathionate. The thiosulfate and sulfite resulting from the decomposition of the tetrathionate can be advantageously recycled in leaching process or in the elution stage of the recovery of gold and/or copper. In a preferred embodiment the eluant may be a mixture of 68 g/L of sodium tetrathionate, 75 g/L of ammonium thiosulfate and 32 g/L of sodium sulfite. Alternatively gold and optionally copper can be eluted from the resin with sodium sulfite or a mixture of sodium chloride and ammonium thiosulfate as the eluant, or a mixture of sodium sulfite and ammonium thiosulfate.

DETAILED DESCRIPTION OF THE INVENTION

Figure 1:
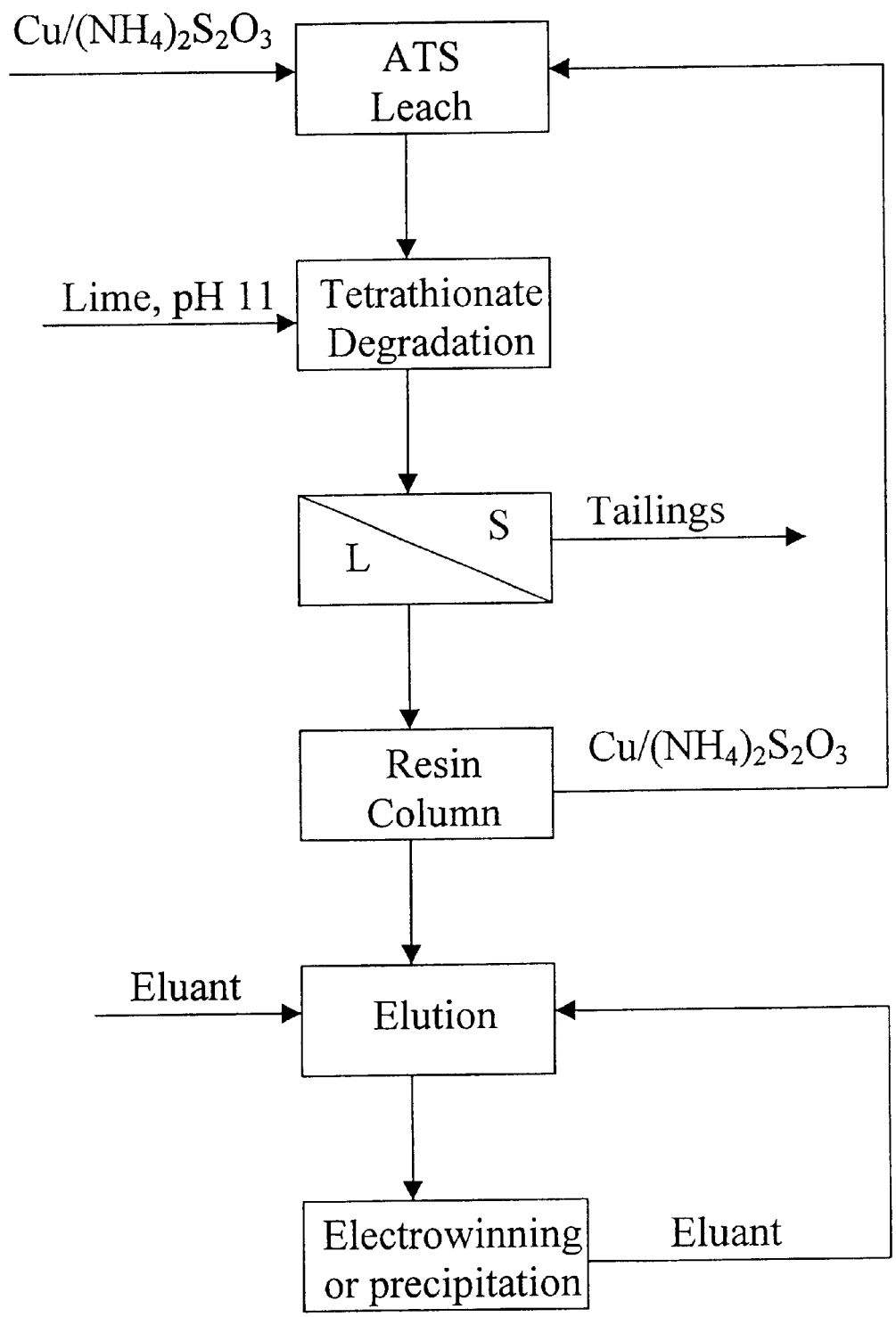
FIG. 1 is a flow sheet illustrating a process for recovering gold from ammonium thiosulfate (ATS) leach solutions using resin-in-pulp (RIP).

In one aspect, the invention provides a process for the recovery of gold from a thiosulfate solution containing polythionates such as tetrathionate with an ion exchange resin. The source of the thiosulfate ion may for example be ammonium thiosulfate, alkali metal thiosulfates such as sodium or potassium sulfate or alkaline earth metal thiosulfates such as calcium thiosulfate, or mixture thereof. In some embodiments, the concentration of thiosulfate may range from about 0.01M to about 4M or saturation. The polythionates may be derived from a variety of sources. For example, in thiosulfate leaching of precious metals ores such as gold ores, large amount of tetrathionate may be generated through copper catalyzed oxidation of thiosulfate. The presence of copper in such solutions may arise naturally from the ores or from addition of cupric ions in the leaching process to enhance the recovery of the precious metals. The concentration of cupric ions may for example be greater than 10 ppm, 50 ppm, 100 ppm or 1000 ppm and may be less than about 5000 ppm, 4000 ppm, 3000 ppm, 2000 ppm, 1000 ppm, 500 ppm, or 100 ppm; or any value within these ranges.

Gold may be loaded onto the resin from a thiosulfate solution and may then be eluted from the resin, generating a gold bearing eluate from which gold may be recovered. A strong base resin with a quaternary amine group attached to a polymeric matrix (e.g. polystyrene) may be preferred over a weak base resin, because the former may have a greater loading capacity and a larger operating pH range. A wide variety of strong base resins may be suitable in alternative embodiments of the invention, such as Amberlite (TM) IRA-410 and IRA-910, manufactured by Rohm & Haas, Dowex (TM) G51, Dowex (TM) G55 and Dowex (TM) 21K, manufactured by Dow Chemical. A weak base resin that can be operated at pH 8 or greater, such as Amberlite IRA-93, may also be used in some embodiments of the invention.

The loading of gold and copper may be fast, with the equilibrium being reached in a few hours. In the absence of copper and tetrathionate, the loading can be performed in a wide pH range, e.g. pH 8–12, and a very high gold concentration on the resin, e.g. 30 kg/t, can be obtained. However, when thiosulfate is being used to leach gold ores, copper may be either added as a catalyst for gold leaching or may be leached from the ore itself (copper-gold ore treatment). As a result, the slurry may contain 0.2 to 2 g/L copper and this copper may greatly accelerate the oxidation of thiosulfate. One of the oxidation products from thiosulfate oxidation may be tetrathionate. Consequently, the ore leach slurry may contain significant levels of tetrathionate in solution (up to many grams per liter). This tetrathionate is strongly loaded on the resin and reduces the gold and copper loading of the resin. For example, in the presence of about 2 g/L tetrathionate gold loading may be reduced by about 90%. The following table shows the results of gold loading from a solution containing 0.1 M ammonium thiosulfate, 10 ppm gold and various amounts of tetrathionate at pH 9. Clearly, in order to prevent resin poisoning, it is necessary to remove tetrathionate from the slurry before contacting with the resin.

| $[S_4O_6]^{2-}$ | Gold on Resin kg/t | | |
|---|---|---|---|
| g/l | G51 | G55 | IRA-410 |
| 0 | 18.3 | 17.9 | 17.2 |
| 2.2 | 2.53 | 2.22 | 3.34 |
| 4.5 | 1.53 | 1.24 | 0.96 |

Note:
The tests were run with 200 ml solution and 0.1 g resin.

Tetrathionate may be degraded by treatment at elevated temperature or by raising the pH of the slurry. Tetrathionate is thermodynamically unstable and the use of higher temperatures will accelerate the rate of decomposition of tetrathionate.

FIG. 1 shows a flow sheet for recovering gold from ammonium thiosulfate leach solutions using the RIP process. A pre-RIP step is required to remove tetrathionate by an alkaline treatment of the slurry. The pH of the slurry is raised to 10.5–11.5, preferably 11, by the addition of alkali, preferably lime or sodium hydroxide. Tetrathionate is decomposed according to the following reaction:

$$2S_4O_6^{2-}+6OH^-\rightarrow 3S_2O_3^{2-}+2SO_3^{2-}+3H_2O$$

The mechanism of the reaction is described in the following equations, in which tetrathionate first decomposes to thiosulfate and trithionate, the latter further decomposes to thiosulfate and sulfite:

$$4S_4O_6^{2-}+6OH^{31}\rightarrow 5S_2O_3^{2-}+2S_3O_6^{2-}+3H_2O$$

$$2S_3O_6^{2-}+6OH^-\rightarrow S_2O_3^{2-}+4SO_3^{2-}+3H_2O$$

The alkaline treatment can be conducted at temperatures ranging between 20° C. and 60° C., preferably at the same temperature for the leaching since no heating is needed. The kinetics of the decomposition of tetrathionate is fast and the rate increases with increasing temperature. Depending on the temperature used, the treatment process takes from half an hour to a few hours.

One of the advantages of this alkaline treatment process is that most of the tetrathionate (75% by weight) is converted back to thiosulfate which, after the RIP process and separation from the residue solids, may be recycled to the leaching circuit. The sulfite generated in the decomposition reaction has little effect on the loading of gold and copper onto the resin.

The RIP process is preferably performed at pH 11 so that no neutralization by addition of acid is required after alkaline treatment. The high pH ensures that tetrathionate is not generated during the RIP process. At high pH, thiosulfate is oxidized to sulfite or sulfate, rather than tetrathionate, as demonstrated by the following reactions:

$$S_2O_3^{2-} + O_2 + 2OH^- \rightarrow 2SO_3^{2-} + H_2O$$

$$S_2O_3^{2-} + 2O_2 + 2OH^- \rightarrow 2SO_4^{2-} + H_2O$$

Another advantage of performing the RIP process at a high pH is an improved selectivity for gold over copper. In the leach slurry copper is known to be present in two forms: one is the cupric ammine complex, $Cu(NH_3)_4^{2+}$, and the other the cuprous thiosulfate complex, $Cu(S_2O_3)_3^{5-}$. The cuprous thiosulfate complex $Cu(S_2O_3)_2^{3-}$ or $Cu(S_2O_3)^-$ or a mixture thereof may also be present. The concentration of free ammonia in the slurry is higher at a higher pH, and so is the cupric/cuprous ratio. Since the cationic cupric ammine complex does not load onto a strong base (or anionic) ion exchange resin, the more copper stays in the cationic form, the more selective is the loading process for gold. For example, a resin such as G51 or 21K, loaded from a solution consisting of 0.1 M ammonium thiosulfate, 0.5 g/L copper and 1–20 mg/L gold, typically contains about 10 kg/t copper and 1–10 kg/t gold.

After the RIP process, the resin is separated from the slurry by screening. Most of the copper stays in the slurry that, along with ammonium thiosulfate, may be recycled to the leaching process after solid/liquid separation. If the copper value is high, a resin recovery process or some other process can be performed to recover the copper.

Gold and copper loaded on the resin is eluted with a mixed solution of sodium tetrathionate, ammonium thiosulfate and sodium sulfite. The addition of thiosulfate is to stabilize the eluted gold and copper and that of sulfite is to prevent the precipitation of elemental sulfur according to the following reactions:

$$S_4O_6^{2-} + S_2O_3^{2-} \rightarrow SO_3^{2-} + S_5O_6^{2-}$$

$$S_5O_6^{2-} \rightarrow S_4O_6^{2-} + S$$

$$SO_3^{2-} + S \rightarrow S_2O_3^{2-}$$

A preferred composition is 68 g/L sodium tetrathionate, 75 g/L ammonium thiosulfate and 32 g/L sodium sulfite. After elution, the resin is reconditioned by treatment with 0.01 M sodium hydroxide to remove the adsorbed tetrathionate.

Alternatively, gold and copper is eluted from the resin using a solution containing from about 120 g/L to about 250 g/L sodium sulfite. In a preferred embodiment the eluant contains 250 g/L. Another effective eluant is a solution containing from about 110 g/L to about 240 g/L sodium chloride and ammonium thiosulfate. In a preferred embodiment the eluant contains 230 g/L sodium chloride and 15 g/L ammonium thiosulfate The elution is complete with all three eluants and the eluate typically contains 50–400 mg/L gold and 50–500 mg/L copper. Gold and copper may be recovered from the eluate solution by electrowinning or cementation and the solution is recycled to the elution process.

Figure 2:
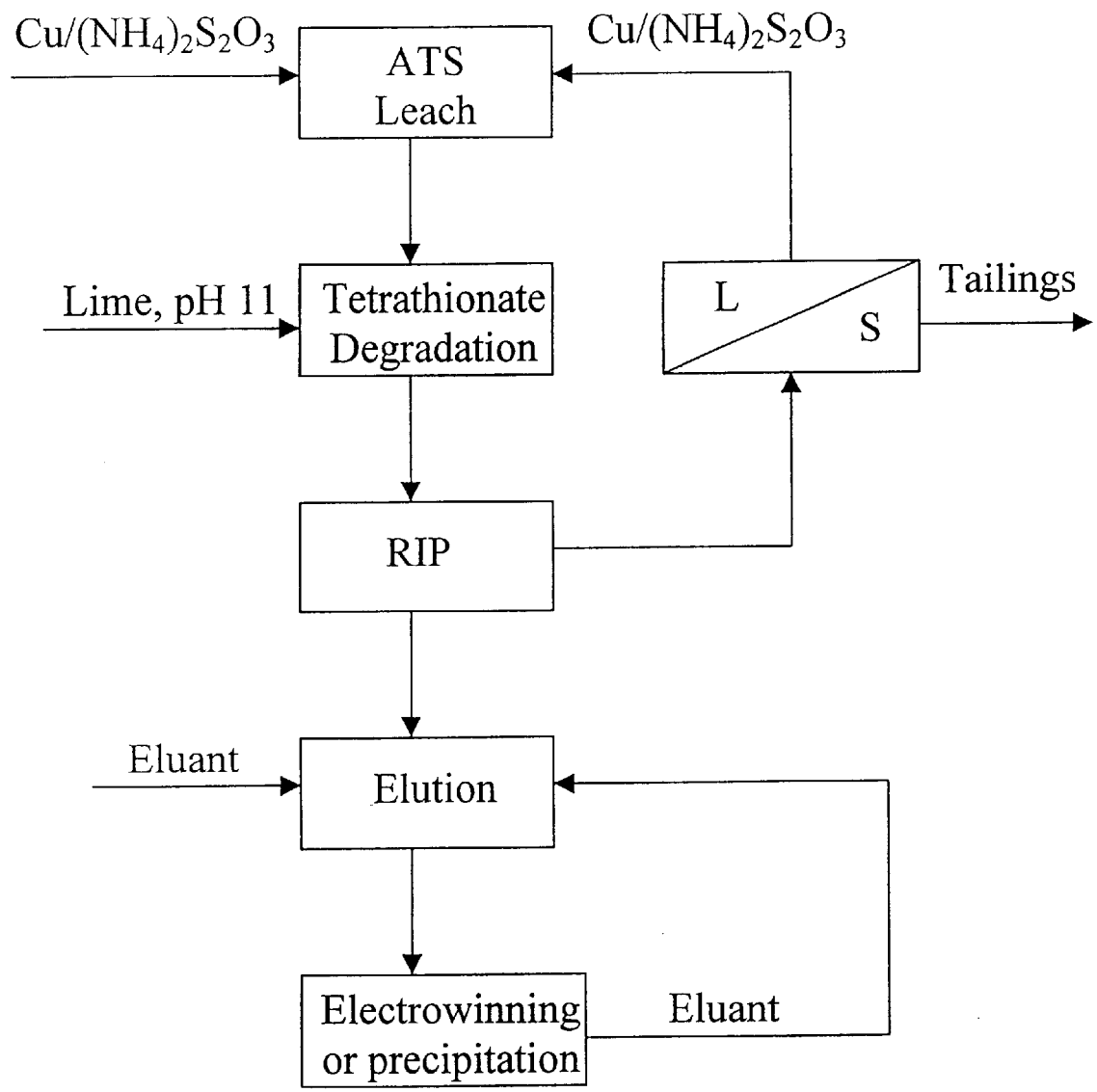
FIG. 2 is a flow sheet showing an alternative process for recovering gold from ammonium thiosulfate (ATS) leach solutions using a resin column.

The flow sheet in FIG. 2 illustrates an alternative process for recovering gold and copper from ammonium thiosulfate solutions. Instead of RIP, a resin column is used to recover the metals. The ATS leaching slurry is alkaline treated followed by solid/liquid separation. The gold and copper bearing solution is then passed through the column to load the metals onto the resin. The effluent containing copper and ammonium thiosulfate is recycled to the leaching process. Gold and copper is eluted from the resin by passing an eluant solution through the columns. All the three eluants described above can be used to elute the metals from the columns.

EXAMPLE 1

In the first group of tests, gold was loaded from a solution containing 10 mg/L gold and 0.1 M ammonium thiosulfate onto various resins. These resins included weak base resins, such as IRA-93 and MP62, and strong base resins, such as IRA-410, IRA-910, G51 and G55. The tests were performed in an orbital shaker at 23° C. and pH 8. The volume of gold solutions used in each of the tests was 100 ml and the amount of resins was 0.8 g for weak base resins and 0.4 g for strong base resins. The loading was fast, with the equilibrium being reached within 2 hours. After equilibrium, gold concentration in the final solution was analyzed by atomic absorption spectroscopy and the amount of gold loaded on the resins was calculated. The results are shown in the following table:

| Resin | $[AU]_{final}$ mg/L | Au on resin kg/t | Au extraction % |
| --- | --- | --- | --- |
| G51 | 0.08 | 2.58 | 99.2 |
| G55 | 0.06 | 2.41 | 99.4 |
| IRA-410 | 0.21 | 2.37 | 97.8 |
| IRA-910 | 0.25 | 2.36 | 97.4 |
| IRA-93 | 0.66 | 1.22 | 93.7 |
| MP62 | 0.59 | 1.23 | 94.3 |

In a second group of tests, the amount of resins and the volume of the solution were varied so that the gold loading at different equilibrium gold concentrations in solution were determined. High gold loading was generally achieved for all resins, though some resins performed better than others. The results are demonstrated as follows:

| Resin | $[Au]_{final}$ mg/L | Au on resin kg/t |
| --- | --- | --- |
| G51 | 0.31 | 10.1 |
|  | 0.57 | 18.3 |
|  | 1.22 | 30.7 |
| G55 | 0.28 | 9.42 |
|  | 0.74 | 17.9 |
|  | 1.33 | 25.1 |
| IRA-410 | 0.35 | 4.67 |
|  | 0.70 | 9.00 |
| IRA-910 | 0.33 | 3.12 |
|  | 0.99 | 8.71 |

EXAMPLE 2

Gold was loaded onto various resins from a solution containing 10 mg/L gold 0.1 M ammonium thiosulfate and 500 mg/L copper, added as cupric sulfate salt. The presence of copper greatly decreased the stability of thiosulfate in the solution.

Again, the tests were performed at 23° C. in an orbital shaker, each containing 100 ml of the solution and various amount of resin. The solutions were deaerated with nitrogen to minimize the loss of thiosulfate through oxidation catalyzed by copper. In order to increase gold loading, the initial pH of the solutions was adjusted to 11.7 by adding sodium hydroxide, since a number of tests showed that at pH lower than 10 gold loading was generally lower than 1 kg/t. The final gold and copper concentrations in the solution were determined by fire assay and atomic adsorption spectroscopy respectively. Gold loaded on resins was calculated from the difference between the initial and the final gold concentrations. After the loading, it was found that most of the copper remained in the solution and the copper loaded on resins was estimated to be about 20 kg/t. The results for gold loading are given below:

| Resin | $[Au]_{final}$ mg/L | Au on resin kg/t | Au extraction % |
|---|---|---|---|
| G51 | 0.24 | 1.58 | 98 |
|  | 0.43 | 2.33 | 96 |
|  | 1.29 | 4.22 | 87 |
| G55 | 0.30 | 1.57 | 97 |
|  | 0.50 | 2.31 | 95 |
|  | 1.70 | 4.02 | 83 |
| IRA-410 | 0.46 | 1.55 | 95 |
|  | 0.79 | 2.24 | 92 |
|  | 1.58 | 4.08 | 84 |

EXAMPLE 3

The loading of gold and copper onto resin columns were tested. Two columns consisting of the resin G51 were used. A solution containing 0.1 M ammonium thiosulfate and 20 mg/L gold, with the pH adjusted to 11 by adding sodium hydroxide, was pumped through Column 1 at a flow rate of 13 bed volumes per hour. A total of 300 bed volumes of solution was used and the amount of gold loaded on the column was 8.92 kg/t. The concentration of gold in the effluent was found to be less than 0.01 mg/L.

Another solution composed of 0.1 M ammonium thiosulfate, 10 mg/L gold and 500 mg/L copper was pumped through Column 2 at a flow rate of about 8 bed volumes per hour. Sodium hydroxide was added to raise the solution pH to 11.5. A total of 240 bed volumes of solution was passed. Gold loading on the column was 3.60 kg/t and no gold was detected in the effluent (<0.01 mg/L). Copper loading was 13.7 kg/t and copper concentration in the effluent was about 460 mg/L.

EXAMPLE 4

Gold was loaded onto resins with a high selectivity over copper. Two 21K resin columns were used for the tests. One of the columns was used for the loading of copper from a solution containing 0.1 M ammonium thiosulfate and 500 mg/L copper. Another column was used to load gold and copper from a solution containing 0.1 M ammonium thiosulfate, 20 mg/L gold and 500 mg/L copper. In both cases the loading was performed at pH 11. The concentrations of the metals in the solution before loading, and in the effluent after loading, were measured using fire assay (for gold) and atomic absorption spectroscopy (for copper) to determine the amount of metals loaded on the resin. On the first column copper was loaded to 21 kg/t, after 67 bed volume solution was passed through the column. This result shows that in the absence of gold, copper can be loaded on the resin to a high concentration. On the second column the loading of gold and copper were 9.21 and 9.08 kg/t respectively with 333 bed volume solution passed. These values corresponded to 94.3% gold recovered from, and 96.4% copper remained in the solution. The ratio of gold over copper on the resin was about 1:1, in comparison with 1:25 in the original loading solution.

EXAMPLE 5

Three columns composed of 21K resin were used to load gold from solutions containing 0.1 M ammonium thiosulfate and 1 mg/L gold in the presence of 100, 200 and 500 mg/L copper respectively. The solutions were pumped through the columns at a flow rate of 30 bed volumes per hour and total 6700 bed volumes of solutions were used on each of the columns. The solution pH was controlled at 11. Gold and copper loaded on Columns 1 and 2 were determined both by resin assay and solution analysis and consistent results were obtained, while on Column 3 they were determined only by solution analysis. Elution was performed on Column 3 with an eluant consisting of 4 M sodium chloride and 0.1 M ammonium thiosulfate at 2 bed volumes per hour. After 20 bed volumes of eluant were passed, 90% gold and 98% copper were eluted from the column, yielding an eluate containing 44 mg/L gold and 320 mg/L copper. The results for gold and copper loading at various copper levels in solution are shown as follows:

|  | Column 1 | Column 2 | Column 3 |
|---|---|---|---|
| Copper in solution (mg/L) | 100 | 200 | 500 |
| Gold on resin (kg/t) | 5.39 | 3.31 | 1.42 |
| Copper on resin (kg/t) | 7.50 | 8.72 | 9.57 |

EXAMPLE 6

Three 21K resin columns were loaded with gold and copper from a solution containing 0.1 M ammonium thiosulfate, 20 mg/L gold and 500 mg/L copper. The loading was performed at pH 11 with the solution passing through the columns at 7–14 bed volumes per hour. About 330 bed volumes of solution were used on each column. Gold loading on the columns was 8.99, 9.16 and 8.50 kg/t respectively and copper loading was 9.91, 10.58 and 7.93 kg/t respectively. The loaded gold and copper were then eluted, each column with a different eluant. Eluant 1 was a solution composed of 0.25 M sodium tetrathionate, 0.25 M sodium sulfite and 0.5 M ammonium thiosulfate. The pH of this solution was about 9. Eluant 2 was a solution containing 2 M sodium sulfite and 1 M ammonia. The pH of this solution was naturally about 12 and was adjusted to 11 using sulfuric acid. Eluant 3 was a solution consisting of 4 M sodium chloride and 0.1 M ammonium thiosulfate. The pH of this solution was about 6 and was raised to 9 using sodium hydroxide. In all cases, gold and copper were effectively stripped from the columns, generating eluates containing 100–200 mg/L gold and copper. The conditions the elution was performed at and the results are shown below:

|  | Column 1 | Column 2 | Column 3 |
|---|---|---|---|
| Gold loading* (kg/t) | 8.99 | 9.16 | 8.50 |
| Copper loading* (kg/L) | 9.91 | 10.58 | 7.93 |
| Eluant | Eluant 1 | Eluant 2 | Eluant 3 |

-continued

|  | Column 1 | Column 2 | Column 3 |
|---|---|---|---|
| Flow rate (bed volume/hour) | 1.8 | 1.6 | 1.8 |
| Eluant bed volume | 50 | 33 | 42 |
| Gold elution | 99.7% | 99.8% | 99.4% |
| Gold in eluate (mg/L) | 120 | 183 | 135 |
| Copper elution | 98.8% | 96.5% | 99.9% |
| Copper in eluate (mg/L) | 131 | 204 | 127 |

*loading values were calculated from the amount of metals eluted and that remained on the resin.

EXAMPLE 7

The degradation of tetrathionate was conducted under alkaline conditions. To start a test, dihydrated sodium tetrathionate salt (5.5 g/L) was dissolve into a solution that was buffered and thermostated. Samples were withdrawn at different times for the analysis of tetrathionate and thiosulfate with ion chromatography. A typical group of data from a test run at pH 11.5 and 22° C. is presented in the following table:

| time hr | $[S_4O_6^{2-}]$ mM | $[S_2O_3^{2-}]$ mM |
|---|---|---|
| 0 | 16.89 | 1.15 |
| 0.083 | 9.51 | 9.36 |
| 0.167 | 6.60 | 14.84 |
| 0.250 | 4.50 | 17.76 |
| 0.333 | 2.90 | 19.71 |
| 0.450 | 1.29 | 21.75 |

The results demonstrate that, as tetrathionate degraded, thiosulfate was generated. The increase in the molarity of thiosulfate was close to 1.5 times the decrease in the molarity of tetrathionate. This is consistent with the stoichiometry of the reaction $$2S_4O_6^{2-}+6OH^- \rightarrow 3S_2O_3^{2-}+2SO_3^{2-}+3H_2O$$

The kinetics of tetrathionate degradation was investigated at various pH and temperature, the factors which greatly affect the rate of the reaction. It was found that under a given constant pH and a given constant temperature, the degradation reaction rate is first order with respect to tetrathionate. The pseudo-first order rate constant $k_1$ was then measured. By measuring $k_1$ at various pH, it was determined that the degradation reaction rate was also first order with respect to hydroxide. Finally, $k_1$ was measured at various temperatures and the activation energy of tetrathionate degradation reaction was determined to be 98.5 kJ/mol for pH 10.5. The $k_1$ values and the times required for 99.9% degradation of the initial tetrathionate under various conditions are listed below:

| PH | T (° C.) | $k_1$ hr$^{-1}$ | $t_{99.9\%}$ (hr) |
|---|---|---|---|
| 10.0 | 22 | 0.139 | 49.7 |
| 10.5 | 22 | 0.376 | 18.4 |
| 11.0 | 22 | 1.25 | 5.5 |
| 11.5 | 22 | 5.33 | 1.3 |
| 10.5 | 30 | 1.02 | 6.8 |
| 10.5 | 35 | 1.94 | 3.6 |
| 10.5 | 40 | 3.63 | 1.9 |
| 11.0 | 35 | 5.63 | 1.2 |

As can be seen from these results, at a pH greater than 10.5 and a temperature higher than 20° C., tetrathionate will be effectively degraded.

EXAMPLE 8

Gold and copper bearing thiosulfate solutions containing significant amounts of tetrathionate were treated by alkalization to remove the tetrathionate before loading the gold onto G51 resin columns.

In one test, 4 g/L dihydrated sodium tetrathionate salt was added to a solution containing 0.1 M ammonium thiosulfate, 10 mg/L gold and 500 mg/L copper. This was followed by an alkaline treatment at pH 12 by adding sodium hydroxide to the solution and leaving the solution for 6 hours for tetrathionate to degrade. The solution was then adjusted to pH 11 using sulfuric acid and pumped through a column of G51 resin. Total 530 bed volumes of solution were passed at a rate of 13 bed volumes per hour. The analysis of the effluent showed that gold and copper were loaded on the column to 6.4 and 23.9 kg/t respectively.

In another test, the same amount of tetrathionate was added to a solution containing 0.1 M ammonium thiosulfate, 20 mg/L gold and 500 mg/L copper. The resultant solution was treated at pH 11 for 6 hours for tetrathionate to degrade and passed through a column of resin G51 at 16 bed volumes per hour. Total 263 bed volumes of solution were used. The loading of gold and copper was determined to be 6.1 and 10.5 kg/t respectively.

The above results show that after alkaline treatment, tetrathionate can be effectively removed from gold and copper bearing thiosulfate solutions so that high gold loading on resins can be achieved in the subsequent loading process.

EXAMPLE 9

Continuous loading/elution operations were carried out on 21K and G51 resin columns for five cycles. In all cases, the loading was conducted with 333 bed volumes of solution composed of 0.1 M ammonium thiosulfate, 20 mg/L gold and 500 mg/L copper (pH 11) at a flow rate of 14 bed volumes per hour. The elution was conducted at 2 bed volumes per hour with a total of 40–50 bed volume eluant. Three different eluants as described in Example 6 were used for each of the resins. In the case of Eluant 1, the column was reconditioned after each elution operation. This was accomplished with 10 bed volume 0.05 M NaOH solution at 3–5 bed volumes per hour to remove the adsorbed tetrathionate on the column. No reconditioning of the column was required if Eluant 2 and Eluant 3 were used. For each individual column and eluant, the loading/elution behaviour was found to be almost exactly the same in each of the five cycles, and the final total elution efficiencies are listed below:

|  | Eluant 1 | | Eluant 2 | | Eluant 3 | |
| --- | --- | --- | --- | --- | --- | --- |
|  | Cu % | Au % | Cu % | Au % | Cu % | Au % |
| 21K | 99.8 | 99.4 | 100.0 | 100.0 | 100.0 | 99.9 |
| G51 | 98.5 | 99.0 | 100.0 | 99.1 | 99.9 | 100.0 |

Although the foregoing invention has been described in some detail by way of illustration and example for purposes of clarity of understanding, it will be readily apparent to those of skill in the art in light of the teachings of this invention that changes and modification may be made thereto without departing from the spirit or scope of the appended claims. All patents, patent applications and publications referred to herein are hereby incorporated by reference.

We claim:

1. A process for loading gold onto an ion exchange resin from a gold-bearing thiosulfate solution having an initial tetrathionate concentration, the process comprising:

(a) adjusting the pH of the gold-bearing thiosulfate solution for a sufficient period of time to produce a gold-bearing loading solution having a tetrathionate concentration reduced relative to the initial tetrathionate concentration; and (b) contacting the gold-bearing loading solution with an ion exchange resin to load gold onto the resin to produce a loaded resin.

2. The process of claim 1 wherein the ion exchange resin is a strong-base resin.

3. The process of claim 1 further comprising the steps of eluting gold from the loaded resin to produce a gold-bearing eluate and recovering gold from the gold-bearing eluate.

4. The process of claim 1 wherein the gold-bearing thiosulfate solution comprises ammonium thiosulfate.

5. The process of claim 1 wherein the pH of the gold-bearing thiosulfate solution is adjusted to a value of from about 10 to about 12.

6. The process of claim 1, wherein the pH of the gold-bearing solution is adjusted to a value from about 10 to about 12.

7. The process of claim 3, wherein the loaded resin is eluted with an eluant selected from the group consisting of a mixture of a tetrathionate, a thiosulfate and a sulfite; a mixture of a sulfite and ammonia; a mixture of a sulfite and a thiosulfate; a mixture of a sulfite, a thiosulfate and ammonia; and a mixture of a chloride and a thiosulfate.

8. A process for loading gold onto an ion exchange resin from a gold-bearing thiosulfate solution having an initial tetrathionate concentration, the process comprising:

(a) adjusting the temperature of the gold-bearing thiosulfate solution for a sufficient period of time to produce a gold-bearing loading solution having a tetrathionate concentration reduced relative to the initial tetrathionate concentration; and (b) contacting the gold-bearing loading solution with an ion exchange resin to load gold onto the resin to produce a loaded resin.

9. A process for eluting gold or copper loaded on an ion-exchange resin comprising passing an eluant containing a sulfite through the resin, wherein the eluant further comprises a thiosulfate, the concentration of said thiosulfate being selected to stabilize eluted gold and copper.

10. The process of claim 9 wherein the eluant further comprises a tetrathionate.

11. The process of claim 10 wherein the eluant comprises about 68 g/L sodium tetrathionate, about 75 g/L ammonium thiosulfate and about 32 g/L of sodium sulfite.

12. A process for recovering gold from a slurry, wherein the slurry comprises a solid ore residue and a gold-bearing thiosulfate leach solution having an initial tetrathionate concentration, the process comprising:

(a) adjusting the pH of the slurry for a sufficient period of time to produce a loading slurry, wherein the loading slurry has a tetrathionate concentration reduced relative to the initial tetrathionate concentration;

(b) contacting the loading slurry with an ion-exchange resin to adsorb gold onto the resin to produce a loaded resin;

(c) separating the loaded resin from the loading slurry;

(d) eluting gold from loaded resin to produce a gold-bearing eluate; and (e) recovering gold from the gold-bearing eluate.

13. The process of claim 12 wherein the ion exchange resin is a strong-base resin.

14. The process of claim 12 wherein the slurry further comprises copper ions.

15. The process of claim 12, wherein the pH of the slurry is adjusted to a value from about 10 to about 12.

16. The process of claim 12 wherein the loaded resin is eluted with an eluant selected from the group consisting of a mixture of a tetrathionate, a thiosulfate and a sulfite; a mixture of a sulfite and ammonia; a mixture of a sulfite and a thiosulfate; a mixture of a sulfite, ammonia, and a thiosulfate; and a mixture of a chloride and a thiosulfate.

17. A process for recovering gold from a slurry, wherein the slurry comprises a solid ore residue and a gold-bearing and copper-bearing thiosulfate leach solution having an initial tetrathionate concentration, the process comprising;

(a) adjusting the pH of the slurry for a sufficient period of time to produce a loading slurry having a tetrathionate concentration reduced relative to the initial tetrathionate concentration;

(b) contacting the loading slurry with an ion-exchange resin to adsorb gold and copper from the loading slurry onto the resin to produce a loaded resin, (c) separating the loaded resin from the slurry;

(d) eluting copper from the loaded resin to produce a copper-bearing eluate;

(e) eluting gold from the loaded resin to produce a gold-bearing eluate; and (f) recovering gold from the gold-bearing eluate.

18. The process of claim 17 wherein the ion exchange resin is a strong-base resin.

19. The process of claim 17 wherein the pH of the slurry is adjusted to a value of about 11 to reduce loading of the copper onto the resin.

20. The process of claim 17 wherein the step of separating the loaded resin from the slurry produces a copper-bearing thiosulfate solution after separation of the resin from the slurry, and the copper-bearing thiosulfate solution is recycled for use in leaching of gold from the solid ore residue.

21. The process of claim 17 comprising eluting the gold and copper loaded resin with an eluant selected from the group consisting of a mixture of a tetrathionate, a thiosulfate and a sulfite; a mixture of a sulfite and ammonia; a mixture of a sulfite and a thiosulfate; a mixture of a sulfite, ammonia, and a thiosulfate; and a mixture of a chloride and a thiosulfate to produce a gold-bearing and copper-bearing eluate.

22. The process of claim 21 wherein gold and copper are respectively recovered from the gold-bearing and copper-bearing eluate by electrowinning or precipitation.

23. A process for recovery gold from a slurry, wherein the slurry comprises a solid ore residue and a gold-bearing and copper-bearing thiosulfate leach solution having an initial tetrathionate concentration, the process comprising:
  (a) adjusting the pH and temperature of the slurry for a sufficient period of time to produce a loading slurry having a tetrathionate concentration reduced relative to the initial concentration;
  (b) contacting the loading slurry with an ion-exchange resin to adsorb gold and copper onto the resin to produce a loaded resin,
  (c) separating the loaded resin from the slurry;
  (d) eluting copper from the loaded resin to produce a copper-bearing eluate; eluting gold from the loaded resin to produce a gold-bearing eluate; and
  (e) recovering gold from the gold-bearing eluate.

24. The process of claim 23 wherein the ion exchange resin is a strong-base resin.

25. The process of claim 23, wherein the pH is adjusted to a value from about 10 to about 12 and the temperature is adjusted to a value from about 20° C. to about 60° C.

26. A process for recovery gold from a slurry, wherein the slurry comprises a solid ore residue and a gold-bearing and copper-bearing thiosulfate leach solution having an initial tetrathionate concentration, the process comprising;
  (a) adjusting the pH of the slurry for a sufficient period of time to produce a loading slurry having a tetrathionate concentration reduced relative to the initial concentration;
  (b) separating the solid ore residue from the slurry to produce a gold-bearing and copper-bearing loading solution;
  (c) contacting the gold-bearing and copper-bearing loading solution with an ion-exchange resin to adsorb gold and copper from the gold-bearing and copper-bearing loading solution onto the resin to produce a loaded resin;
  (d) eluting copper from the loaded resin to produce a copper-bearing eluate;
  (e) eluting gold from the loaded resin to produce a gold-bearing eluate; and
  (f) recovering gold from the gold-bearing eluate.

27. The process of claim 26 wherein the ion exchange resin is a strong-base resin.

28. The process of claim 26, wherein the pH of the slurry is adjusted to a value from about 10 to about 12.

29. The process of claim 26 comprising eluting the gold and copper loaded resin with an eluant selected from the group consisting of a mixture of a tetrathionate, a thiosulfate and a sulfite; a mixture of a sulfite and ammonia; a mixture of a sulfite and a thiosulfate; a mixture of a sulfite, ammonia, and a thiosulfate; and a mixture of a chloride and a thiosulfate to produce a gold-bearing and copper-bearing eluate.

30. The process of claim 1, wherein the pH of the gold-bearing thiosulfate solution is adjusted to a value from about 10.5 to about 12.

31. The process of claim 12, wherein the pH of the slurry is adjusted to a value from about 10.5 to about 12.

32. The process of claim 17, wherein the pH of the slurry is adjusted to a value from about 10.5 to about 12.

33. The process of claim 23, wherein the pH of the slurry is adjusted to a value from about 10.5 to about 12 and the temperature is adjusted to a value from about 20° C. to about 60° C.

34. The process of claim 26, wherein the pH of the slurry is adjusted to a value from about 10.5 to about 12.

* * * * *

UNITED STATES PATENT AND TRADEMARK OFFICE
CERTIFICATE OF CORRECTION

PATENT NO. : 6,632,264 B2
DATED : October 14, 2003
INVENTOR(S) : Zhang et al.

It is certified that error appears in the above-identified patent and that said Letters Patent is hereby corrected as shown below:

Title page
Item [56], References Cited, OTHER PUBLICATIONS,
"HEMMATI, et al., Study of the Thiosulphate Leaching of Gold from Carbonaceous Ore..." reference, delete "Qunatitative", insert -- Quantitative --; and delete "Metalurgy", insert -- Metallurgy --
"AWADALLA, et al., The Recovery of Gold from Thiourea, Theioyanate" reference, delete "pp. 1207-1208", insert -- pp. 1207-1228 --.
"ROBINSON, R.E., The Chemistry of the Ion Exchange Process..." reference, delete "Rapid", insert -- Rand --
"TAO, J., et al. Electrochemistry and Mechanisms of Leaching..." reference, delete "XVII", insert -- XVIII --
"GALLAGHER, N.P., Affinity of Activated Carbon Towards Some..." reference, delete "Complexes.", insert -- Complexes, --
"LYONS, D. et al., Inorganic Sulphur Chemistry.." reference, delete "Chemistry, ,", insert -- -Chemistry, --
"MOLLEMAN, E., The Treatment of Copper-Gold Ores by Ammonium ..." reference, delete "fo", insert -- of --
"GUERRA, E., a Study of the Factors Affecting Copper Cementation of Gold ..." reference, delete "Guerra, E., a Study", insert -- Guerra, E. et al., A Study --

Column 12,
Line 34, delete "the process comprising;", insert -- the process comprising: --
Line 41, delete "a loaded resin,", insert -- a loaded resin; --

UNITED STATES PATENT AND TRADEMARK OFFICE
CERTIFICATE OF CORRECTION

PATENT NO. : 6,632,264 B2
DATED : October 14, 2003
INVENTOR(S) : Zhang et al.

It is certified that error appears in the above-identified patent and that said Letters Patent is hereby corrected as shown below:

Column 13,
Line 4, delete "recovery", insert -- recovering --
Line 14, delete "a loaded resin,", insert -- a loaded resin; --
Line 25, delete "recovery", insert -- recovering --

Signed and Sealed this

Twenty-eighth Day of June, 2005

JON W. DUDAS
*Director of the United States Patent and Trademark Office*